DENNIS C. WILCOX, OF MERIDEN, ASSIGNOR TO MERIDEN BRITANNIA COMPANY, OF WEST MERIDEN, CONNECTICUT.

*Letters Patent No. 83,747, dated November 3, 1868.*

IMPROVEMENT IN THE MANUFACTURE OF DOUBLE-WALL ICE-PITCHERS.

The Schedule referred to in these Letters Patent and making part of the same.

*To all whom it may concern:*

Be it known that I, DENNIS C. WILCOX, of the city of Meriden, county of New Haven, and State of Connecticut, have invented certain new and useful Improvements in the Process of the Manufacture of Double-Wall Ice-Pitchers; and to enable others skilled in the art to make and use the same, I will proceed to describe.

The nature of this invention consists in electrotyping the upper end or edges of the inner wall (in such cases as where said inner wall is coated or enamelled,) by the art of electro-metallurgy.

One object of electrotyping the upper end is to prevent that portion of the metal unprotected by a coating or enamelling from rusting or corrosion.

And second, to prepare the surface so that it may be easily tinned, if desirable, before the soldering is commenced, which will materially facilitate the soldering, thus providing a surface by which the upper edges of the inner and outer walls may be firmly united by the common mode or process of soldering, and thereby render the space between the two walls impervious to air or water, except as special provision may be made for the purpose of exhausting or drying away the damp which may accumulate between the said walls.

Heretofore, in the manufacture of "double-wall porcelain-lined ice-pitchers," it has been impossible to make a perfectly tight joint at the upper end of the vessel for any length of time, for the reason that it is impossible to heat the shell, after the enamelling, sufficiently to thoroughly tin the edge, without great damage to the enamel or porcelain.

The inner wall must necessarily be made of hard metal, as iron, &c., in order to sustain sufficient heat to secure unity of the enamel with the metal. Then, after it has been enamelled, it will not bear to be heated sufficient to perfectly tin the upper end; hence this improvement.

It will be perfectly obvious that after the enamelling-operation is completed, the upper end or edges of the vessel, freed from enamel, can be electrotyped in the common way of "electro-metallurgy," thereby securing a deposit of any metal susceptible of being held in solution, and having an affinity with or for solder, as zinc or copper, which will secure a perfect unity of metals by the common process of soldering, and also prevent corrosion and the ultimate yielding of the joints, and consequent leakage and utter destruction of the whole vessel.

I believe I have thus shown the nature and process of the manufacture of this improvement, so as to enable others skilled in the art to practise the same therefrom.

What I claim, and desire to secure by Letters Patent, is—

Electrotyping the upper end or unprotected surface of a glazed-coated or enamelled vessel, substantially as and for the purpose described.

DENNIS C. WILCOX. [L. S.]

Witnesses:
C. C. FORKETT,
JOHN BARTON, Jr.